W. C. STEPHENSON & A. J. DRAPALIK.
GRINDING MACHINE.
APPLICATION FILED JAN. 22, 1915.
1,156,504.
Patented Oct. 12, 1915.
4 SHEETS—SHEET 1.
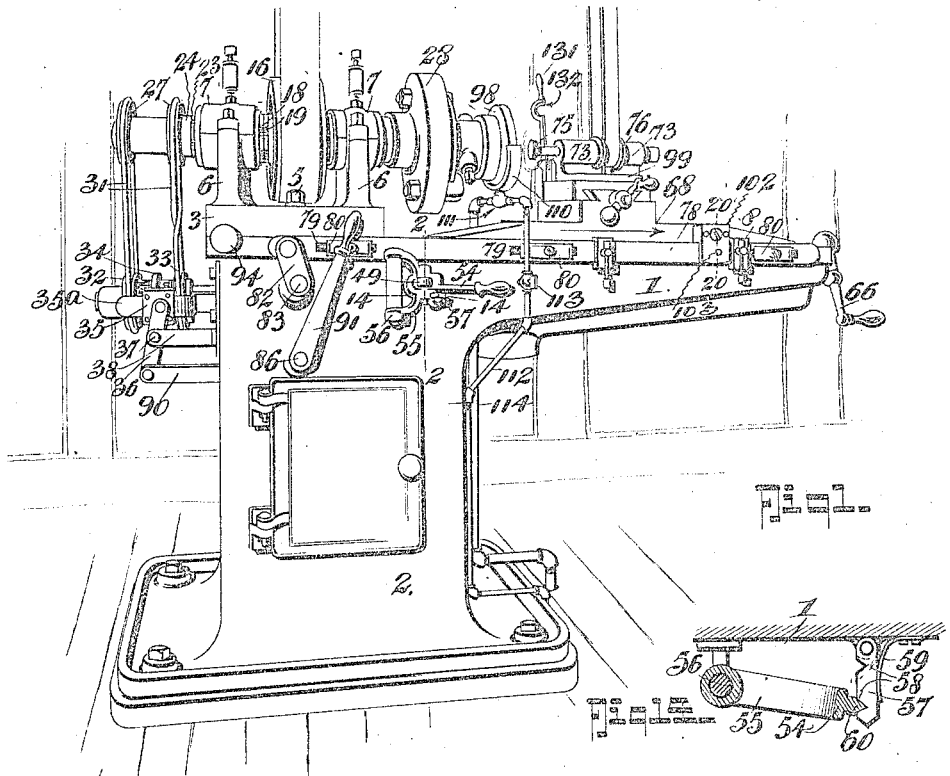
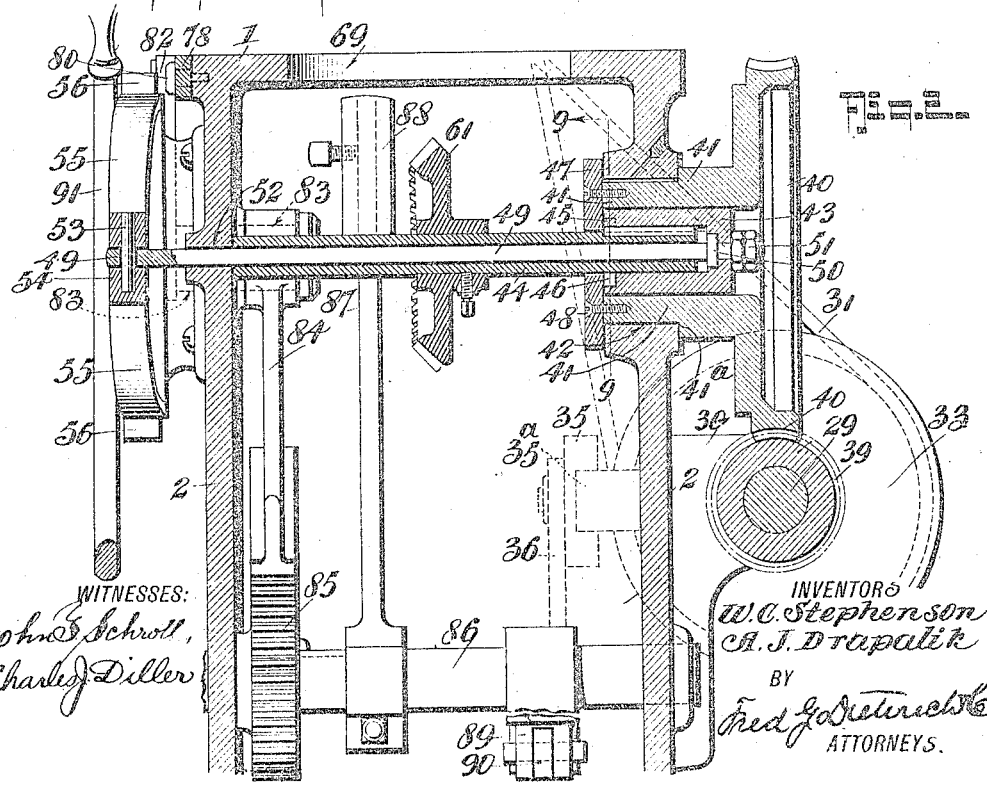
WITNESSES:
John S. Schroll
Charles J. Diller
INVENTORS
W. C. Stephenson
A. J. Drapalik
BY
Fred G. Dieterich
ATTORNEYS.

W. C. STEPHENSON & A. J. DRAPALIK.
GRINDING MACHINE.
APPLICATION FILED JAN. 22, 1915.
1,156,504.
Patented Oct. 12, 1915.
4 SHEETS—SHEET 2.
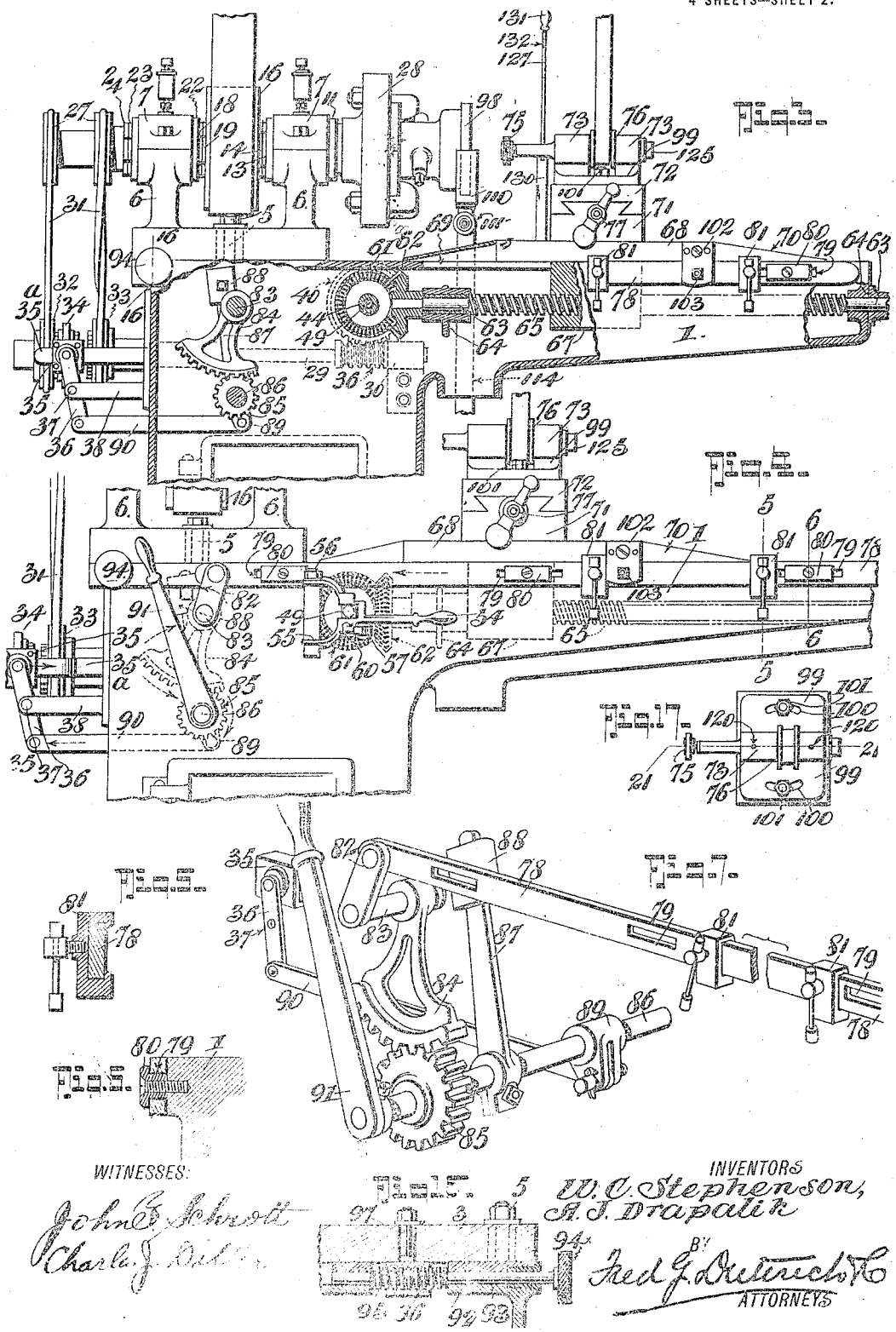
WITNESSES:
John G. Schrott
Charles J. [illegible]
INVENTORS
W. C. Stephenson,
A. J. Drapalik
By Fred G. Dieterich
ATTORNEYS

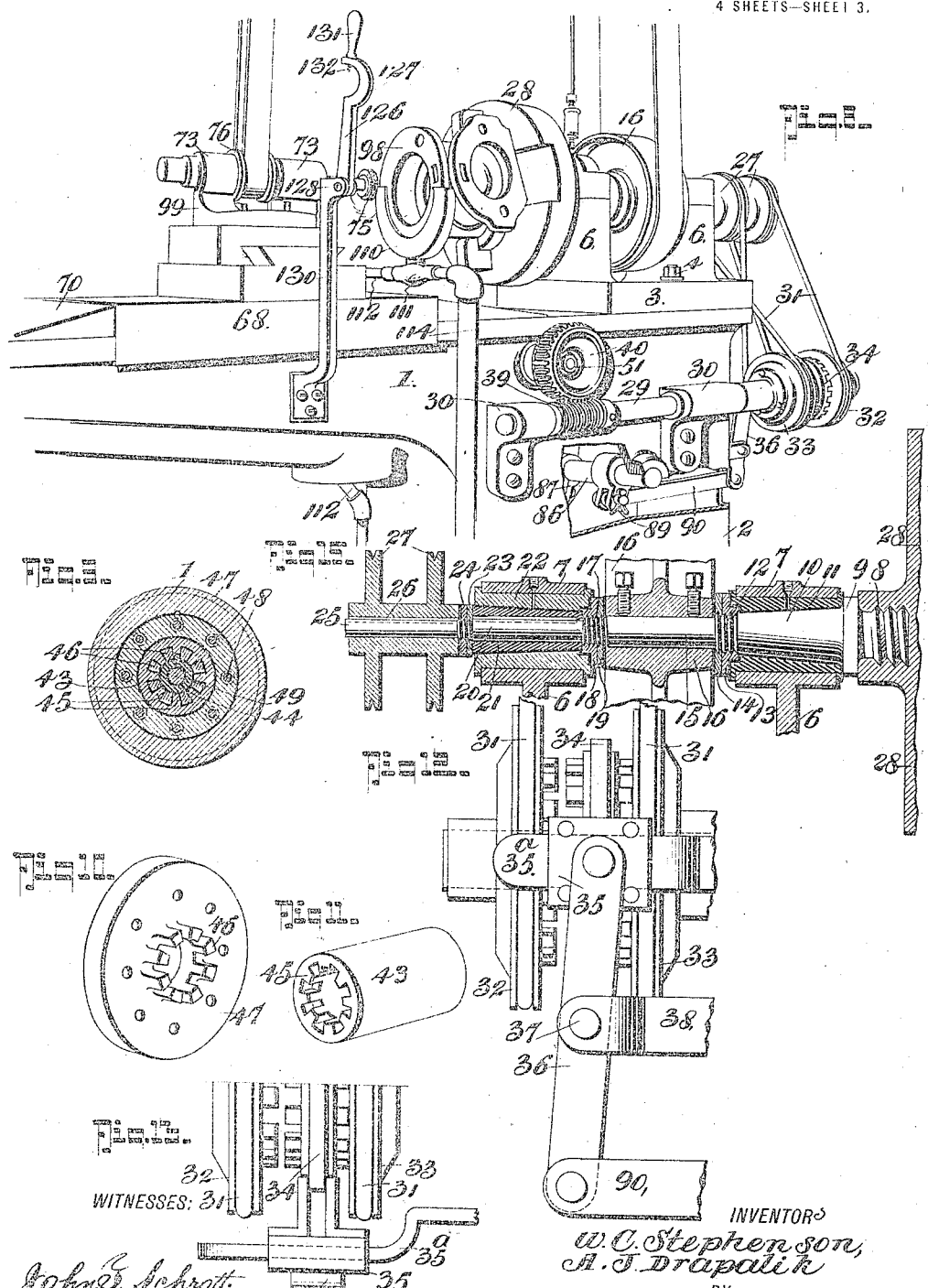

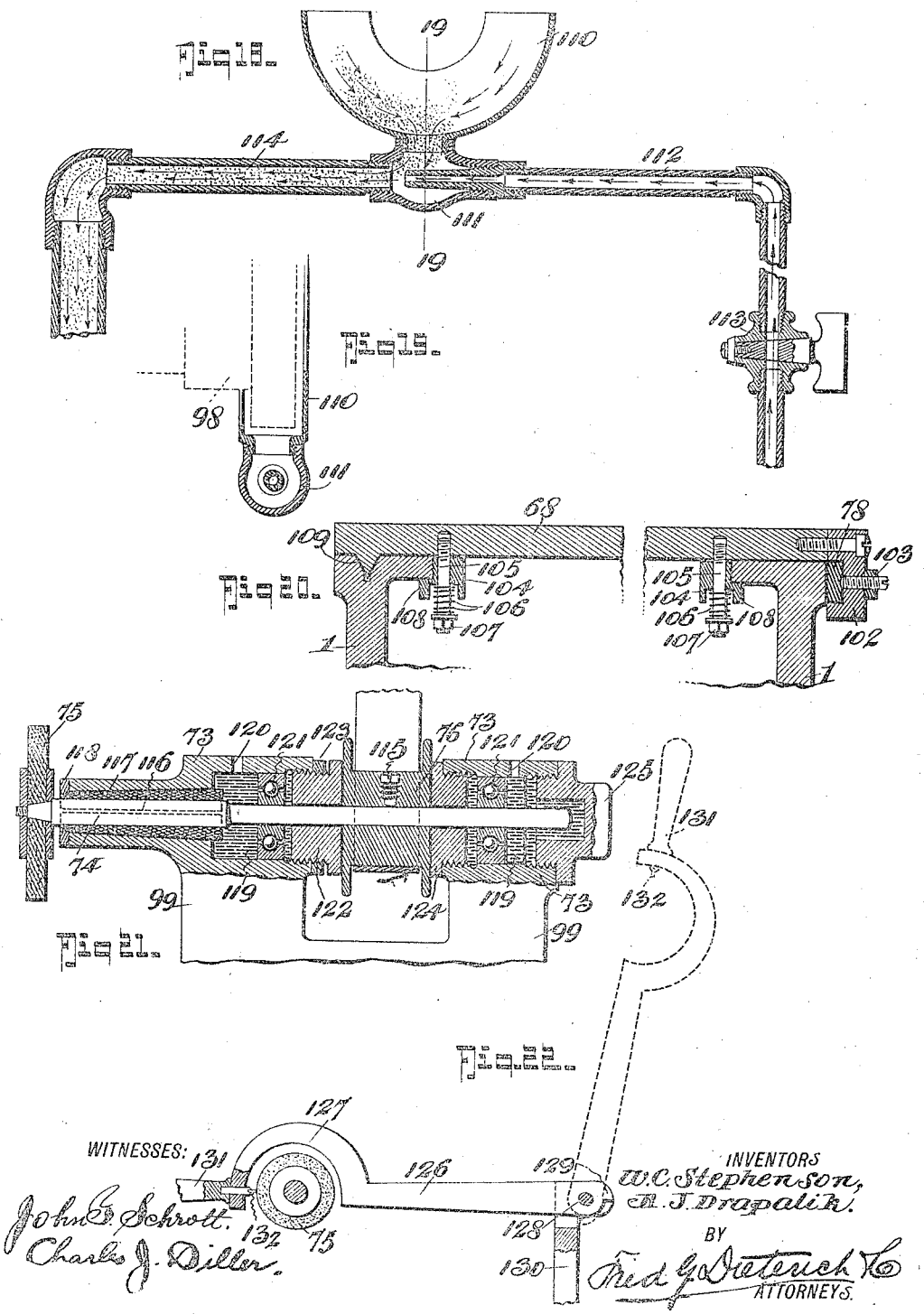

UNITED STATES PATENT OFFICE.

WILLIAM CURRY STEPHENSON AND ALFRED J. DRAPALIK, OF ROCKY MOUNT, NORTH CAROLINA, ASSIGNORS OF ONE-HALF TO CHARLES M. NEWMAN, OF ROCKY MOUNT, NORTH CAROLINA.

GRINDING-MACHINE.

1,156,504.  Specification of Letters Patent.  Patented Oct. 12, 1915.

Application filed January 22, 1915. Serial No. 3,805.

*To all whom it may concern:*

Be it known that we, WILLIAM C. STEPHENSON and ALFRED J. DRAPALIK, residing at Rocky Mount, in the county of Edgecombe and State of North Carolina, have invented certain new and useful Improvements in Grinding-Machines, of which the following is a specification.

This invention relates to machines for internal, external, and surface grinding, and it is especially designed for use in air brake repair work, such as the grinding of triple valve bushings, air pump governor cylinders, brake valve rotories and seats, and the left hand main steam valve head for Westinghouse air pumps.

It is one of the principal objects of the present invention to provide a machine in which the above work can be accurately, effectively and inexpensively accomplished, and to provide a machine which is self-contained, capable of all necessary adjustments, having provision for taking up wear of parts, and also provided with mechanism whereby the grinding tool may be automatically fed back and forth with relation to the work.

Generically, the invention comprises a bed and support on which is (preferably) an adjustable spindle carriage that has provision for receiving the chuck spindle, a grinding tool carriage that is movable along the bed to and from the chuck by hand or by automatic mechanism, the automatic mechanism being controlled by hand so as to be thrown into and out of action, as desired, and an automatic reversing gear for reversing the direction of movement of the grinding tool carriage when it reaches the ends of its path of reciprocatory travel.

More subordinately, the invention includes provisions for adjusting the distance through which the carriage is moved back and forth, the provision of means for adjusting the position of the spindle carriage and of the tool carriage to allow for grinding tapers, means for taking up wear in the grinding tool spindle bearings, provision of means for collecting and ejecting the grindings from the work and provision of means for dressing the grinding tool.

Again, the invention includes those novel details of construction, combination and arrangement of parts, all of which will be first fully described, then specifically pointed out in the appended claims, and illustrated in the accompanying drawings, in which:—

Figure 1 is a perspective view of a grinding machine embodying the invention. Fig. 2 is an enlarged cross section of a part of the machine taken on the line 2—2 of Fig. 1. Fig. 3 is a side elevation and part vertical section of a portion of the machine showing the working parts. Fig. 4 is a side elevation of a part of the machine. Fig. 5 is a cross section on the line 5—5 of Fig. 4. Fig. 6 is a cross section on the line 6—6 on Fig. 4. Fig. 7 is a detail perspective view of the parts comprising the reversing gear. Fig. 8 is a perspective view of a portion of the machine looking from the rear, a part of the standard being broken away to show the interior mechanism. Fig. 9 is a cross section on the line 9—9 of Fig. 2. Fig. 10 is a detail perspective view of the gear retaining disk with its clutch face. Fig. 11 is a detail perspective of the shiftable clutch sleeve. Fig. 12 is an elevation of the clutch, belt pulley and a portion of the reversing gear for the tool carriage feed. Fig. 13 is a detail top plan view of the same. Fig. 14 is a detail plan and section showing a latch for holding the clutch in its "in" and "out" position, the view being a section on the line 14—14 on Fig. 1. Fig. 15 is a detail vertical section of the chuck spindle showing the adjustable take-up bearings. Fig. 16 is a detail vertical cross section on the line 16—16 of Fig. 3. Fig. 17 is a detail plan view of the grinder tool holder showing how it may be adjusted for grinding tapers, etc. Fig. 18 is a detail cross section illustrating the construction of the dust or grinding ejector. Fig. 19 is a detail cross section on the line 19—19 of the same. Fig. 20 is a detail cross section on the line 20—20 of Fig. 1. Fig. 21 is a detail vertical section on the line 21—21 on Fig. 17. Fig. 22 is a detail side elevation, parts being broken away illustrating the manner of using the grinding tool dressing implement.

In the drawings, in which like letters and numerals of reference indicate like parts in all of the figures, 1 is the bed of the machine, which is carried on the standard 2, and 3 is the chuck spindle carriage which is secured to the bed by bolts 4—5.

The spindle carriage 3 has bearing standards 6 that carry the bearings 7 for the spindle. The spindle is constructed as best shown in Fig. 15, by reference to which it will be seen that the front or projecting end is threaded at 8, to receive the chuck 28 and provided with a collar 9 that abuts the bearing bushing 11 for the front bearing. The bushing 11 is bored with a taper to fit upon the tapered portion 10 of the spindle and it is held in place by jam nuts 13—14 that engage the threaded part 12 of the spindle. The spindle is also provided with a portion 15 to receive the driving pulley 16, which pulley is secured to the spindle in any desired way, as for instance by set screws, as shown in Fig. 15. The spindle is also threaded at 17 to receive the adjusting and jam nuts 18—19, which engage the bearing bushing 22, the bushing 22 being bored conically in a reverse way to the bushing 11, so as to receive the conical sleeve 21 that is keyed on the spindle section 20 and is held adjustably between the jam nuts 18—19, and the jam nuts 23—24.

25 is the rearwardly projecting end of the spindle on which the double belt pulley 27 is keyed, as at 26.

29 is a worm shaft which is mounted in bearings on the rear of the standard 2. The shaft 29 carries a pair of loose belt pulleys 32—33 respectively around which the endless belts 31 take, the belts 31 passing also around the pulley 27, one of the belts 31 being crossed, as shown, to effect a reverse drive. Each pulley 32—33 has a clutch face to coöperate with the shifting clutch element 34 that is designed to be shifted by a slider 35, which is forked to the shifting clutch element 34, (see Fig. 13) and is slidable on a guide 35ª projecting from the side of the standard 2. The slider 35 is moved by a lever 36, that is fulcrumed at 37 on a bracket 38, and is operated by the automatic shifting mechanism shown best in Fig. 7 and hereinafter again referred to. The worm 39 meshes with the worm gear 40 (see Figs. 2 and 8) and the worm gear 40 has a hollow hub 41, which is mounted in a bearing 42 in the standard 2 and shouldered to abut the bearing, the gear 40 being held in place in the bearing by the shoulder 41ª and by a disk 47, which is secured at 48 to the hub 41.

43 is a shiftable clutch sleeve that is keyed to the hollow shaft 44 which carries the bevel pinion 61 hereinafter again referred to. The shiftable clutch sleeve 43 has a clutch face 45 to engage the clutch face 46 of the disk 47 when the parts are brought together and the sleeve 43 is shoved in the hub 41 by a rod 49 which is mounted in the hollow shaft 44 and forms a bearing for the same, the rod 49 projecting, also, through a bearing 52 in the front wall of the standard 2 and being pin-connected at 53 to a hand lever 54, which is bifurcated at 55 and pivoted at 56 to a bracket extending from the standard 2. The other end of the rod 49 has a collar 50 and passes through the closed end of the tubular clutch sleeve 43 where it has a swivel bearing with respect to the clutch sleeves, the rod being held from reciprocation with relation to the clutch sleeve by the collar 50 and jam nuts 51. The lever 54 is held in either of its two positions ("in" or "out") by any suitable latch device. One form of latch device adapted for this purpose is shown in Fig. 14, by reference to which it will be seen that the lever 54 may be provided with a projection 60 to engage one of a pair of notches 58 in a latch 57 that may be spring pressed at 59 into engagement with the lever 54.

62 is a bevel pinion which is keyed on a shaft 63 that is provided with a double square thread 65 to engage the projecting lug 67 of the tool slide or carriage 68 and move it in a longitudinal direction along the bed 1. The gear 62 meshes with the gear 61. The shaft 63 is mounted in bearings 65 against longitudinal motion and there is provided a handle 66, on the projecting end of the shaft 63, by which the carriage 68 may be moved along the bed by hand, if desired. The lug 67 projects through a slot 69 in the bed 1 and the carriage 68 has an upwardly projecting portion 71 that has a dove-tail slide connection with a block 72 which is adapted to be fed transversely by the usual screw and handle mechanism 77, the block 72 forming the support on which the grinding tool bearing block 99 is mounted. In order that the block 99 may be turned through 120° or thereabout to allow for grinding tapers, the block 99 is bolted to the block 72 by bolts 101 that pass through slots 100 in the block 99.

The carriage 68 has a projection that rides in a longitudinal groove 109 (see Fig. 20) in the bed 1 and there is also provided a set screw 103 for locking the bar 78 to the finger 102. In addition the carriage 68 is provided with guides 104 which overlap the edges of the bed, as shown at 108 and are held in position by bolts 105 that carry supporting springs 106 and are provided with an attachment 107 by means of which the tension on the springs may be regulated. The block 99 has bearings 73 in which the shaft 74 is rotatably mounted and between which the driving pulley 76 for the tool shaft 74 is located.

75 is the grinding disk which is mounted on the tool shaft 74. The shaft 74 of the grinding tool is provided with a bearing 116, which is split and receives the shaft, and has a tapered exterior to fit into the tapered bearing portion 117 of the block 99, the bushing 116 being provided with a nut 118 by means of which wear may be taken up. The bearings 73 are provided with oiling holes 120 and are chambered as at 119 to receive the ball bearings 121 for the shaft 74. The chamber 119 of the forward bearing is closed by an adjustable plug 122 that is held by a jam nut 123, while the chamber of the latter bearing is closed by plugs 124—125. The pulley 76 is held on the shaft 74 from turning, by a set screw 115.

70 is a dust guard that is carried by the carriage 68 to close the slot 69 and prevent grindings from passing down into the bed and interfering with the proper operation of the interior mechanism.

The reversing gear, which is best shown in Fig. 7, comprises a slide bar 78 that is slotted at 79 at intervals and secured at 80 along the upper edge of the machine bed 1 for a limited longitudinal movement. The slide bar 78 is provided with a pair of adjustable stops 81 between which the shifting finger 102, that is carried by the carriage 68, is movable. The slide bar 78 is pivoted to a lever 82 that is carried by a stub shaft 83, the latter shaft being mounted in a suitable bearing in the standard 2 and also carrying a gear segment 84 which meshes with a pinion 85 on the reversing shaft 86. The shaft 86 is mounted in bearings in the standard and has an arm 87 rigidly secured to it and projecting upwardly therefrom. The arm 87 is provided with an adjustable weight 88 which, when the center of gravity is passed will serve to turn the shaft 86 one way or another, according to the side to which the weight 88 falls.

89 is a crank which is carried by the shaft 86 and linked with the lever 36.

91 is a handle mounted on the outer projecting end of the shaft 86 and by means of which the reversing action may be manually obtained.

In order to adjust the spindle carriages 3 for purpose of taper grinding the same may be provided with a pivoted projection 96 secured at 97 to the carriage and receiving the worm 95 of the adjusting shaft 93, that is mounted in bearings 92 in the bed of the machine, the shaft 93 being provided with a member 94, by means of which it may be turned.

98 indicates a triple valve in place on the chuck 28 and in position to be groun In the operation of grinding triple valves, the triple valve 98 is clamped to the chuck 28, properly centered for operation, and the grinding tool 75 is adjusted with relation to the work to effect the grinding operation. The lever 91 is then thrown over to shift the clutch element 34 in engagement with one or the other of the pulleys 32—33, which causes the carriage 68 to be moved along the bed 1. Assuming that the parts are in the position shown in Fig. 3, the carriage 68 will be moving toward the work. The stops 81 are so adjusted that when the grinding tool 75 has reached the limit of its desired movement into the work, the slide bar 78 will have been moved sufficiently to bring the weight 88 slightly past the "dead" center onto the other side of the same, whereupon the weight 88 will cause the lever 87 to turn the shaft 86 to rapidly disengage the clutch element 34 from the pulley 32 and shift it into engagement with the pulley 33 thereby reversing the direction of movement of the carriage 68. As soon as the tool has been withdrawn the desired amount, the finger 102 will engage the other stop 81 and shift the bar 78 in the opposite direction, thereby again shifting the clutch element 34 from the pulley 32 to the pulley 33, and the tool 75 will be again fed to the work. This operation is continued indefinitely, it being understood, of course, that the attendant properly adjusts the tool 75 after it has been moved in and out to take up wear on the work. When it is desired to grind tapered surfaces, the block 99 and carriage 3 are adjusted to bring them in the proper correlative positions to effect the desired grinding, as will be clearly understood by those skilled in the art.

The drawings illustrate a preferred embodiment of the invention and we do not wish to be understood as being confined to the specific details of construction further than are set out in the appended claims.

In Fig. 22, we have shown in detail the tool or implement employed for truing up the face of the grinding disk 75 and by reference to that figure it will be observed that this implement comprises a bracket 130 that is adapted to be bolted or otherwise secured to the bed of the machine (see Fig. 8) and has a lug to which the arm 126 is pivoted at 128. The arm 126 has a bow 127 to pass around the disk 75 and carries a dressing tool 132 and is also provided with a handle 131, by means of which the arm 126 can be swung up, as shown in dotted lines in Fig. 22, or lowered, as shown in full lines in that figure, it being understood that a suitable stop 129 is provided to hold the arm 126 in its inactive position.

From the foregoing description taken in connection with the accompanying drawings, it is thought the complete construction, operation and advantages of our invention will be readily understood by those skilled in the art.

What we claim is:

1. In a grinding machine, a bed, a spindle stock on the bed, a chuck spindle mounted on the stock, and means for turning said spindle; a grinder tool carriage movable along the bed toward and from the chuck, and means for rotating the tool; mechanism for effecting the movements of the tool carriage; and means for driving said mechanism from said spindle.

2. In a grinding machine, a bed, a spindle stock on the bed, a chuck spindle mounted on the stock, means for turning said spindle; a grinder tool carriage movable along the bed toward and from the chuck, means for rotating the tool; mechanism for effecting the movements of the tool carriage, means for driving said mechanism from said spindle, said driving means including a shiftable clutch element, loose clutch pulleys coöperative with said element and rotatable in opposite directions, and a reversing gear connection with said shiftable clutch element.

3. In a grinding machine, a bed, a spindle stock on the bed, a chuck spindle mounted on the stock, means for turning said spindle; a grinder tool carriage movable along the bed toward and from the chuck, means for rotating the tool; means for driving said mechanism from said spindle, said driving means including a shiftable clutch element, loose clutch pulleys coöperative with said element and rotatable in opposite directions, and a reversing gear connected with said shiftable clutch element, said reversing gear including a slide bar, stops on said bar and a stop engaging finger carried by said grinder tool carriage.

4. In a grinding machine, a bed, a spindle stock on the bed, a chuck spindle mounted on the stock, means for turning said spindle; a grinder tool carriage movable along the bed toward and from the clutch, means for rotating the tool; mechanism for effecting the movements of the tool carriage, means for driving said mechanism from said spindle, said driving means including a shiftable clutch element, loose clutch pulleys coöperative with said element and rotatable in opposite directions, and a reversing gear connected with said shiftable clutch element, said reversing gear including a rock shaft, a weighted arm on said rock shaft, a lever connected to said shiftable clutch element, a connection between said lever and said rock shaft, and means for moving said rock shaft to convey said weighted lever beyond the "dead" center.

5. In a grinding machine, a bed, a spindle stock on the bed, a chuck spindle mounted on the stock, means for turning said spindle; a grinder tool carriage movable along the bed toward and from the chuck, means for rotating the tool; mechanism for effecting the movements of the tool carriage, means for driving said mechanism from said spindle, said driving means including a shiftable clutch element, loose clutch pulleys coöperative with said element and rotatable in opposite directions, and a reversing gear connected with said shiftable clutch element, said reversing gear including a slide bar, stops on said bar and a stop engaging finger carried by said grinder tool carriage, said reversing gear including a rock shaft, a weighted arm on said rock shaft, a lever connected to said shiftable clutch element, a connection between said lever and said rock shaft, a slide bar, stops on said slide bar, and a stop engaging finger on said tool carriage, and an operating connection between said bar and said rock shaft for moving said rock shaft to convey said weighted lever beyond the "dead" center.

6. In a grinder, a bed or standard, a chuck spindle carriage or stock mounted on said standard, said stock having bearing uprights, a spindle supported in said uprights, said spindle comprising tapered bearing bushing receiving portions, bearing bushings for the respective bearings bored to fit said tapered bushing receiving portions, a driving pulley mounted on said spindle between said tapered portions, said spindle having a chuck receiving end, and means for adjusting the tapered portions of said spindle with relation to the respective bearing bushings to take up wear; a grinding tool carriage mounted on said bed, a grinding tool rotatably mounted on said tool carriage, means for rotating said tool, and means for feeding said tool carriage toward or from the spindle carriage.

7. In a grinder, a bed and standard, a chuck spindle carriage or stock mounted on said standard, said stock having bearing uprights, a spindle supported in said uprights, said spindle comprising tapered bearing bushing receiving portions, bearing bushings for the respective bearings bored to fit said tapered bushing receiving portions, a driving pulley mounted on said spindle between said tapered portions, said spindle having a chuck receiving end, means for adjusting the tapered portions of said spindle with relation to the respective bearing bushings to take up wear; a grinding tool carriage mounted on said bed, a grinding tool rotatably mounted on said tool carriage, means for rotating said tool, means for feeding said tool carriage toward or from the spindle carriage, said last named means comprising a screw supported by the bed and coöperatively connected with said tool carriage, said spindle having a rearwardly projecting end, driving pulleys on said projecting end, and a power transmitting connection between said driving pulleys and said screw for effecting the movements of said tool carriage.

8. In a grinder, a bed and standard, a chuck spindle carriage or stock mounted on said standard, said stock having bearing uprights, a spindle supported in said uprights, said spindle comprising tapered bearing bushing receiving portions, bearing bushings for the respective bearings bored to fit said tapered bushing receiving portions, a driving pulley mounted on said spindle between said tapered portions, said spindle having a chuck receiving end, means for adjusting the tapered portions of said spindle with relation to the respective bearing bushings to take up wear; a grinding tool carriage mounted on said bed, a grinding tool rotatably mounted on said tool carriage, means for rotating said tool, means for feeding said tool carriage toward or from the spindle carriage, said last named means comprising a screw supported by the bed and coöperatively connected with said tool carriage, said spindle having a rearwardly projecting end, driving pulleys on said projecting end, a power transmitting connection between said driving pulleys and said screw for effecting the movements of said tool carriage, said power transmitting connections including a countershaft, a pair of clutch pulleys mounted on said countershaft, power transmitting connections between the respective clutch pulleys and said spindle for effecting rotation of said clutch pulleys in opposite directions, a shiftable clutch element coöperating with said clutch pulleys, and means for actuating said shiftable clutch element.

9. In a grinder, a bed and standard, a chuck spindle carriage or stock mounted on said standard, said stock having bearing uprights, a spindle supported in said uprights, said spindle comprising tapered bearing bushing receiving portions, bearing bushings for the respective bearings bored to fit said tapered bushing receiving portions, a driving pulley mounted on said spindle, between said tapered portions, said spindle having a chuck receiving end, means for adjusting the tapered portions of said spindle with relation to the respective bearing bushings to take up wear; a grinding tool carriage mounted on said bed, a grinding tool rotatably mounted on said tool carriage, means for rotating said tool, means for feeding said tool carriage toward or from the spindle carriage, said last named means comprising a screw supported by the bed and coöperatively connected with said tool carriage, said spindle having a rearwardly projecting end, driving pulleys on said projecting end, a power transmitting connection between said driving pulleys and said screw for effecting the movements of said tool carriage, said power transmitting connections including a countershaft, a pair of clutch pulleys mounted on said countershaft, power transmitting connections between the respective clutch pulleys and said spindle for effecting rotation of said clutch pulleys in opposite directions, a shiftable clutch element coöperating with said clutch pulleys, and a reverse gear mechanism controlled by the movements of the tool carriage for actuating said shiftable clutch element to effect a reciprocatory movement in the tool carriage.

10. In a grinder, a bed and standard, a chuck spindle carriage or stock mounted on said standard, said stock having bearing uprights, a spindle supported in said uprights, said spindle comprising tapered bearing bushing receiving portions, bearing bushings for the respective bearings bored to fit said tapered bushing receiving portions, a driving pulley mounted on said spindle between said tapered portions, said spindle having a chuck receiving end, means for adjusting the tapered portions to take up wear, a grinding tool carriage mounted on said bed, a grinding tool rotatably mounted on said tool carriage, means for rotating said tool, means for feeding said tool carriage toward or from the spindle carriage, said last named means comprising a screw supported by the bed and coöperatively connected with said tool carriage, said spindle having a rearwardly projecting end, driving pulleys on said projecting end, power transmitting connections between said driving pulleys and said screw for effecting the movements of said tool carriage, said power transmitting connections including a countershaft, a pair of clutch pulleys mounted on said countershaft, power transmitting connections between the respective clutch pulleys and said spindle for effecting rotation of said clutch pulleys in opposite directions, a shiftable clutch element coöperating with said clutch pulleys, means for actuating said shiftable clutch element, and means for arresting the movement of the said screw, said means including a manually operated shiftable clutch member in said first mentioned power transmitting connection.

11. In a grinder, a bed and standard, a chuck spindle carriage or stock mounted on said standard, said stock having bearing uprights, a spindle supported in said uprights, said spindle comprising tapered bearing bushing receiving portions, bearing bushings for the respective bearings bored to fit said tapered bushing receiving portions, a driving pulley mounted on said spindle, between said tapered portions, said spindle having a chuck receiving end, means for adjusting the tapered portions of said spindle with relation to the respective bearing bushings to take up wear, a grinding tool carriage mounted on said bed, a grinding tool rotatably mounted on said tool carriage, means for rotating said tool, means for feeding said tool carriage toward or from the spindle carriage, said last named means comprising a screw supported by the bed and coöperatively connected with said tool carriage, said spindle having a rearwardly projecting end, power transmitting connections between said driving pulleys and said screw for effecting of said tool carriage, said power transmitting connections including a countershaft, a pair of clutch pulleys mounted on said countershaft, power transmitting connections between the respective clutch pulleys and said spindle for effecting rotation of said clutch pulleys in opposite directions, a shiftable clutch element coöperating with said clutch pulleys, a reverse gear mechanism controlled by the movements of the tool carriage for actuating said shiftable clutch element to effect a reciprocatory movement in the tool carriage, and means for arresting the movement of said screw, said means including a manually operated shiftable clutch member in said first mentioned power transmitting connection.

12. In a grinder, a standard and bed, a spindle carriage adjustably mounted on said bed, a spindle rotatably mounted in said carriage, means for driving said spindle, a chuck carried by said spindle, a grinding tool carriage longitudinally movable on said bed toward and from said chuck, a grinding tool adjustably and rotatably mounted on said tool carriage, means for rotating said grinding tool, a feed screw for moving said tool carriage toward or from said chuck, and a mechanism for driving said feed screw from said spindle, said mechanism including power transmitting connections between said spindle and said screw, and means for operatively connecting and disconnecting said power transmitting connections.

13. In a grinder, a standard and bed, a spindle carriage adjustably mounted on said bed, a spindle rotatably mounted in said carriage, means for driving said spindle, a chuck carried by said spindle, a grinding tool carriage longitudinally movable on said bed toward and from said chuck, a grinding tool adjustably and rotatable mounted on said tool carriage, means for rotating said grinding tool, a feed screw for moving said tool carriage toward or from said chuck, a mechanism for driving said feed screw from said spindle, said mechanism including power transmitting connections between said spindle and said screw, means for operatively connecting and disconnecting said power transmitting connections, and means for reversing the action of said power transmitting connections on said screw.

14. In a grinder, a standard and bed, a spindle carriage adjustably mounted on said bed, a spindle rotatably mounted in said carriage, means for driving said spindle, a chuck carried by said spindle, a grinding tool carriage longitudinally movable on said bed toward and from said chuck, a grinding tool adjustably and rotatably mounted on said tool carriage, means for rotating said grinding tool, a feed screw for moving said tool carriage toward or from said chuck, a mechanism for driving said feed screw from said spindle, said mechanism including power transmitting connections between said spindle and said screw, means for operatively connecting and disconnecting said power transmitting connections, means for reversing the action of said power transmitting connections on said screw, said reversing means including oppositely rotatable driving members, and a shiftable clutch element coöperating with the same, and means for actuating said shiftable clutch element.

15. In a grinder, a standard and bed, a spindle carriage adjustably mounted on said bed, a spindle rotatably mounted in said carriage, means for driving said spindle, a chuck carried by said spindle, a grinding tool carriage longitudinally movable on said bed toward and from said chuck, a grinding tool adjustably and rotatably mounted on said tool carriage, means for rotating said grinding tool, a feed screw for moving said tool carriage toward and from said chuck, a mechanism for driving said feed screw from said spindle, said mechanism including power transmitting connections between said spindle and said screw, means for said power transmitting connections, means operatively connecting and disconnecting for reversing the action of said power transmitting connections on said screw, said reversing means including oppositely rotatable driving members, a shiftable clutch element coöperating with the same, means for actuating said shiftable clutch element, said last named means comprising an automatic reversing gear including a slide bar and a finger on the tool carriage for actuating said slide bar as said tool carriage reaches the limits of its movement toward or from said chuck.

16. In a grinding machine, a standard and bed, a spindle rotatably mounted on said bed, means for driving said spindle, a work holder carried by said spindle, a grinding tool carriage movable along said bed toward and from said work holder, a rotatable grinding tool mounted on said tool carriage, and means for driving said grinding tool, a feed screw carried by the bed and connected with said tool carriage, a shaft transversely mounted in said standard, gear connections between said screw and said shaft, a worm gear loosely mounted on said shaft, a shiftable clutch element for connecting said worm gear with said shaft, a manually operated member for shifting said shiftable clutch element into and out of engagement, a worm shaft mounted on said standard and having a worm in engagement with said worm gear, loose clutch pulleys mounted on said worm shaft, a shiftable clutch element carried by said worm shaft to coöperate with said clutch pulleys, driving pulleys mounted on said spindle and belt connections between said driving pulleys and said clutch pulleys to effect rotation of said clutch pulleys in opposite directions, and means for shifting said shiftable clutch element.

17. In a grinding machine, a standard and bed, a spindle rotatably mounted on said bed, means for driving said spindle, a work holder carried by said spindle, a grinding tool carriage movable along said bed toward and from said work holder, a rotatable grinding tool mounted on said tool carriage and means for driving said grinding tool, a feed screw carried by the bed and connected with said tool carriage, a shaft transversely mounted in said standard, gear connections between said screw and said shaft, a worm gear loosely mounted on said shaft, a shiftable clutch element for connecting said worm gear with said shaft, a manually operated member for shifting said shiftable clutch element into and out of engagement, a worm shaft mounted on said standard and having a worm in engagement with said worm gear, loose clutch pulleys mounted on said worm shaft, a shiftable clutch element carried by said worm shaft to coöperate with said clutch pulleys, driving pulleys mounted on said spindle, belt connections between said driving pulleys and said clutch pulleys to effect rotation of said clutch pulleys in opposite directions, a lever connected with said shiftable clutch element, a stub shaft, a crank on said stub shaft, a link bar connecting said crank with said lever, and a hand operated lever on said stub shaft for turning the same.

18. In a grinding machine, a standard and bed, a spindle rotatably mounted on said bed, means for driving said spindle, a work holder carried by said spindle, a grinding tool carriage movable along said bed toward and from said work holder, a rotatable grinding tool mounted on said tool carriage and means for driving said grinding tool, a feed screw carried by the bed and connected with said tool carriage, a shaft transversely mounted in said standard, gear connections between said screw and said shaft, a worm gear loosely mounted on said shaft, a shiftable clutch element for connecting said worm gear with said shaft, a manually operated member for shifting said shiftable clutch element into and out of engagement, a worm shaft mounted on said standard and having a worm in engagement with said worm gear, loose clutch pulleys mounted on said worm shaft, a shiftable clutch element carried by said worm shaft to coöperate with said clutch pulleys, driving pulleys mounted on said spindle, belt connections between said driving pulleys and said clutch pulleys to effect rotation of said clutch pulleys in opposite directions, a lever connected with said shiftable clutch element, a stub shaft, a crank on said stub shaft, a link bar connecting said crank with said lever, a hand operated lever on said stub shaft for turning the same, a slide bar, adjustable stops carried by said slide bar, a finger carried by said tool carriage to coöperate with said stops and actuate said slide bar and a power transmitting connection between said slide bar and said stub shaft for converting the reciprocating motion of said slide bar into rotary motion in said stub shaft to effect the shifting of said shiftable clutch element.

19. In a grinding machine, a standard and bed, a spindle rotatably mounted on said bed, means for driving said spindle, a work holder carried by said spindle, a grinding tool carriage movable along said bed toward and from said work holder, a rotatable grinding tool mounted on said tool carriage and means for driving said grinding tool, a feed screw carried by the bed and connected with said tool carriage, a shaft transversely mounted in said standard, gear connections between said screw and said shaft, a worm gear loosely mounted on said shaft, a shiftable clutch element for connecting said worm gear with said shaft, a manually operated member for shifting said shiftable clutch element into and out of engagement, a worm shaft mounted on said standard and having a worm in engagement with said worm gear, loose clutch pulleys mounted on said worm shaft, a shiftable clutch element carried by said worm shaft to coöperate with said clutch pulleys, driving pulleys mounted on said spindle, belt connections between said driving pulleys and said clutch pulleys to effect rotation of said clutch pulleys in opposite directions, a lever connected with said shiftable clutch element, a stub shaft, a crank on said stub shaft, a link bar connecting said crank with said lever, a hand operated lever on said stub shaft for turning the same, a slide bar, adjustable stops carried by said slide bar, a finger carried by said tool carriage to coöperate with said stops and actuate said slide bar and a power transmitting connection between said slide bar and said stub shaft for converting the reciprocating motion of said slide bar into rotary motion in said stub shaft to effect the shifting of said shiftable clutch element, and means on said stub shaft for throwing over the same after said slide bar has turned said stub shaft a predetermined distance in either direction to effect a quick shifting action on said shiftable clutch member.

20. In a grinding machine, a bed, a spindle stock on the bed, a chuck spindle mounted on the stock, and means for turning said spindle; a grinder tool carriage movable along the bed toward and from the chuck, means for rotating the tool; mechanism for effecting the movements of the tool carriage; means for driving said mechanism from said spindle; and means for collecting and removing the dust and grindings from the machine.

21. In combination the work holder of a grinding machine, of a dust collector comprising a receptacle adapted to fit around the work, an ejector into which the receptacle delivers, a discharge duct from the ejector and a motive fluid transmitting duct delivering into the ejector.

22. In a machine of the character stated, a support having a pair of bearings provided with oil collecting and retaining chambers, one of said bearings having a tapering bearing surface, a shaft mounted in said bearings, a taper sleeve on said shaft to fit said taper bearing surface, and means for adjusting said sleeve to take up wear, a driving pulley secured to said shaft between said bearings, and means for admitting lubricant into said bearing chambers, said shaft having an outer projecting end and a grinding disk secured to said end.

23. In a machine of the character stated, a support having a pair of bearings provided with oil collecting and retaining chambers, one of said bearings having a tapering bearing surface, a shaft mounted in said bearings, a taper sleeve on said shaft to fit said taper bearing surface, means for adjusting said sleeve to take up wear, a driving pulley secured to said shaft between said bearings, means for admitting lubricant into said bearing chambers, said shaft having an outer projecting end and a grinding disk secured to said end, ball bearing elements within said bearing chambers for supporting said shaft.

WILLIAM CURRY STEPHENSON.
ALFRED J. DRAPALIK.

Witnesses:
RICHARD SPEIGTE BUNN,
C. W. BLANKENSHIP.